(12) United States Patent
Pedersen et al.

(10) Patent No.: US 10,748,399 B2
(45) Date of Patent: Aug. 18, 2020

(54) SMOKE DETECTOR DYNAMIC RANGE ADJUSTMENT SYSTEM AND METHOD

(71) Applicant: Autronica Fire & Security AS, Trondheim (NO)

(72) Inventors: Ole Martin Pedersen, Trondheim (NO); Per Johan Vannebo, Trondheim (NO); Fredleif Buaas-Hansen, Stjørdal (NO)

(73) Assignee: AUTRONICA FIRE & SECURITY AS, Trondheim (NO)

( * ) Notice: Subject to any disclaimer, the term of this patent is extended or adjusted under 35 U.S.C. 154(b) by 0 days.

(21) Appl. No.: 16/315,938

(22) PCT Filed: Jul. 11, 2017

(86) PCT No.: PCT/EP2017/067458
§ 371 (c)(1),
(2) Date: Jan. 7, 2019

(87) PCT Pub. No.: WO2018/011232
PCT Pub. Date: Jan. 18, 2018

(65) Prior Publication Data
US 2019/0156641 A1    May 23, 2019

Related U.S. Application Data

(60) Provisional application No. 62/360,749, filed on Jul. 11, 2016.

(51) Int. Cl.
*G08B 17/107*   (2006.01)
*G08B 29/14*    (2006.01)
*G01N 21/47*    (2006.01)
*G08B 29/28*    (2006.01)

(52) U.S. Cl.
CPC .......... *G08B 17/107* (2013.01); *G01N 21/47* (2013.01); *G08B 29/145* (2013.01); *G08B 29/28* (2013.01)

(58) Field of Classification Search
CPC .... G08B 17/107; G08B 29/145; G08B 29/28; G01N 21/47
See application file for complete search history.

(56) References Cited

U.S. PATENT DOCUMENTS 4,757,306 A    7/1988  Kimura
4,785,283 A *  11/1988 Yuchi ..................... G08B 17/00
                                                340/501
(Continued)

FOREIGN PATENT DOCUMENTS

EP    0489232 A1    6/1992
EP    0881610 B1    6/2003
(Continued)

OTHER PUBLICATIONS

International Search Report and Written Opinion regarding PCT/EP2017/067458; dated Oct. 23, 2017; 13 pgs.
(Continued)

*Primary Examiner* — Quan-Zhen Wang
*Assistant Examiner* — Mancil Littlejohn, Jr.
(74) *Attorney, Agent, or Firm* — Cantor Colburn LLP

(57) ABSTRACT

A smoke detector dynamic range adjustment system includes a light emitting element for emitting light at a plurality of light output levels, the plurality of light output levels automatically adjusted by a controller when a saturation limit is approached. The system also includes a light receiving element for receiving light emitted from the light emitting element.

5 Claims, 4 Drawing Sheets

(56) References Cited

U.S. PATENT DOCUMENTS

| | | | |
|---|---|---|---|
| 5,212,470 | A | 5/1993 | Thuillard |
| 5,477,218 | A | 12/1995 | Manmoto et al. |
| 5,673,027 | A | 9/1997 | Morita |
| 5,699,043 | A | 12/1997 | Vane et al. |
| 7,474,226 | B2 | 1/2009 | Mi et al. |
| 7,659,986 | B2 | 2/2010 | Sugimoto |
| 8,232,885 | B2 * | 7/2012 | Hoshino .............. G08B 17/107 250/574 |
| 8,638,436 | B2 | 1/2014 | Dohi |
| 8,797,531 | B2 | 8/2014 | Knox et al. |
| 8,907,802 | B2 | 12/2014 | Erdtmann |
| 2006/0007010 | A1 | 1/2006 | Mi et al. |
| 2007/0013898 | A1 | 1/2007 | Wolters et al. |
| 2008/0221711 | A1 | 9/2008 | Trainer |
| 2014/0333928 | A1 * | 11/2014 | Erdtmann ............ G08B 17/107 356/338 |

FOREIGN PATENT DOCUMENTS

| | | | |
|---|---|---|---|
| WO | 2000072282 A1 | 11/2000 | |
| WO | 2004102498 A1 | 11/2004 | |
| WO | WO-2004102498 A1 * | 11/2004 | ............. G01N 21/53 |

OTHER PUBLICATIONS

Aspey, R.A., et al., "Multiwavelength sensing of smoke using a polychromatic LED: Mie extinction characterization using HLS analysis", abstract, IEEE Sensors Journal (vol. 5, Issue: 5), Oct. 2005, 2 pages.

* cited by examiner

SMOKE DETECTOR DYNAMIC RANGE ADJUSTMENT SYSTEM AND METHOD

CROSS-REFERENCE TO RELATED APPLICATIONS

This application is based on International Application No. PCT/EP2017/067458 filed on Jul. 11, 2017, which claims priority to U.S. Provisional Patent Application Ser. No. 62/360,749, filed on Jul. 11, 2016, both of which are incorporated herein by reference in their entireties.

BACKGROUND OF THE DISCLOSURE

The embodiments described herein generally relate to smoke detectors and, more particularly, to systems and methods of increasing the dynamic range of smoke detectors.

The ability to detect the presence of fire and/or smoke provides for the safety of occupants and property. In particular, because of the rapid expansion rate of a fire, it is important to detect the presence of a fire as early as possible. Smoke detectors are employed to assist with early detection.

In some smoke detectors, different light wavelengths and/or different angles of scattering may be used to identify smoke or aerosol. When the concentration reaches a certain level, the detection circuitry will be saturated. Typically, a saturated signal results in initiation of an alarm. Saturation prevents the option to discern between a non-alarm situation and an alarm situation. This undesirably leads to a nuisance alarm upon saturation.

BRIEF DESCRIPTION OF THE DISCLOSURE

According to one embodiment, a smoke detector dynamic range adjustment system includes a light emitting element for emitting light at a plurality of light output levels, the plurality of light output levels automatically adjusted by a controller when a saturation limit is approached. The system also includes a light receiving element for receiving light emitted from the light emitting element.

In addition to one or more of the features described above, or as an alternative, further embodiments may include that automatically adjusting the plurality of light output levels comprises reducing the light output level.

In addition to one or more of the features described above, or as an alternative, further embodiments may include that the plurality of light output levels comprises a first output level and a second output level, wherein the second output level is less than the first output level.

In addition to one or more of the features described above, or as an alternative, further embodiments may include that the second output level is half of the first output level.

In addition to one or more of the features described above, or as an alternative, further embodiments may include that a dynamic range of the smoke detector is doubled by adjusting to the second output level relative to operation under only the first output level.

In addition to one or more of the features described above, or as an alternative, further embodiments may include that the plurality of light output levels comprises a third output level that is less than the second output level.

In addition to one or more of the features described above, or as an alternative, further embodiments may include that the third output level is half of the second output level.

In addition to one or more of the features described above, or as an alternative, further embodiments may include that a dynamic range of the smoke detector is quadrupled by adjusting to the third output level relative to operation under only the first output level.

According to another embodiment, a method of increasing a dynamic range of a smoke detector is provided. The method includes emitting light from a light emitting element of the smoke detector. The method also includes receiving light emitted from the light emitting element with a light receiving element. The method further includes automatically reducing a light output level of the light emitting element as a saturation limit of the smoke detector is approached to increase the dynamic range.

In addition to one or more of the features described above, or as an alternative, further embodiments may include that automatically reducing the light output level comprises reducing from a first light output level to a second light output level, wherein the second light output level is half of the first light output level.

In addition to one or more of the features described above, or as an alternative, further embodiments may include reducing the light output level from the second light output level to a third light output level when the saturation limit is approached.

In addition to one or more of the features described above, or as an alternative, further embodiments may include that the third light output level is half of the second light output level.

In addition to one or more of the features described above, or as an alternative, further embodiments may include that increasing the dynamic range dynamically distinguishes between dangerous and non-dangerous smoke or aerosols in a saturation situation to avoid nuisance alarms.

These and other advantages and features will become more apparent from the following description taken in conjunction with the drawings.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION OF THE DISCLOSURE

Figure 1:
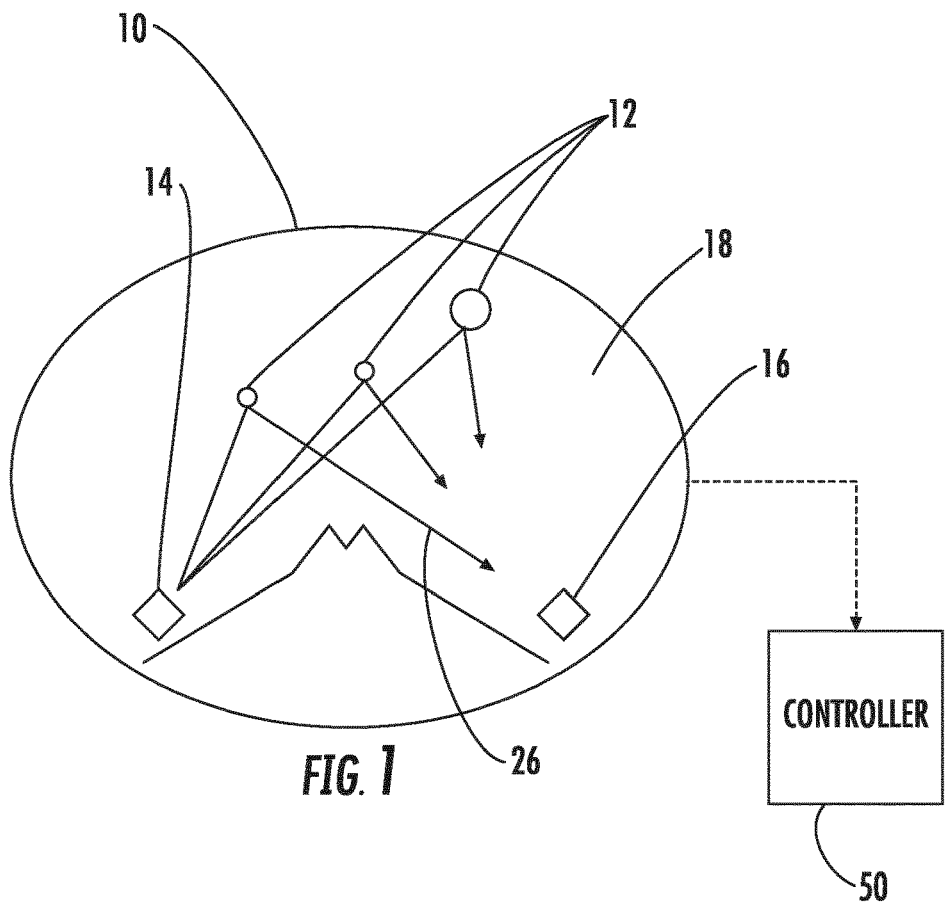
FIG. 1 is a schematic illustration of a smoke detector in a first condition.
Figure 2:
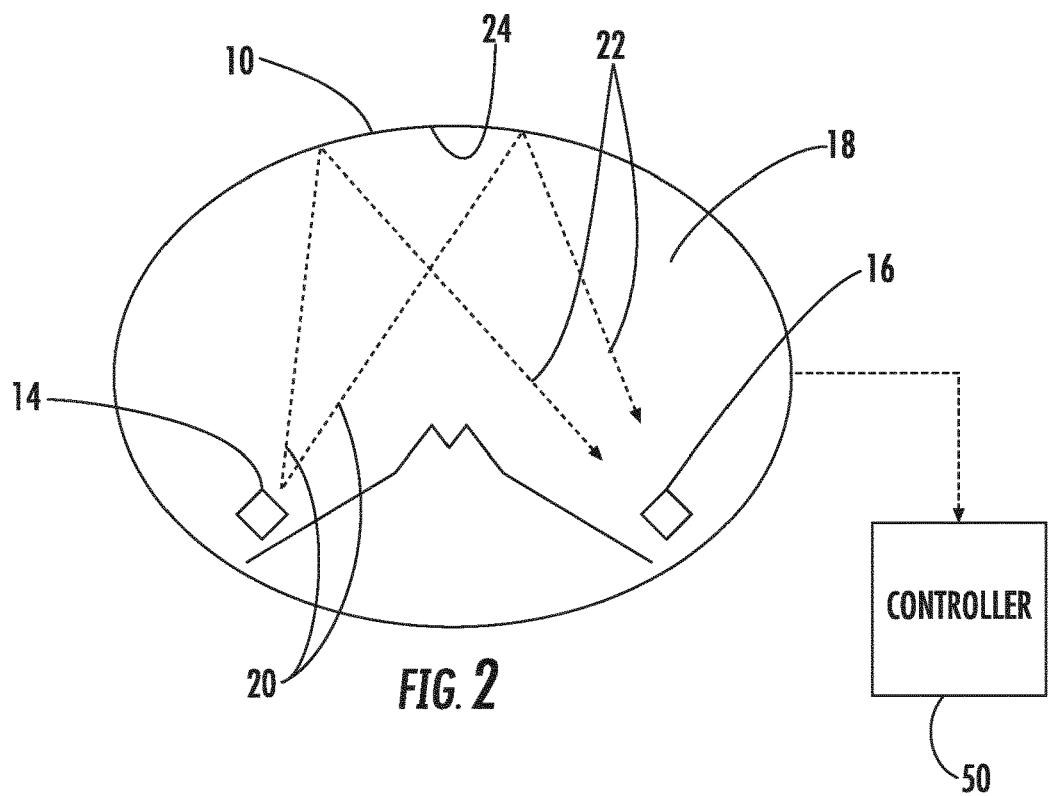
FIG. 2 is a schematic illustration of the smoke detector in a second condition.

Referring to FIGS. 1 and 2, a smoke detector is illustrated and generally referenced with numeral 10. The smoke detector 10 is operable to sense the presence of smoke particles 12 and to generate or to initiate an alarm signal. The smoke detector 10 may be realized as a stand-alone system or may be part of a fire monitoring system comprising a plurality of such smoke detectors and/or other types of smoke detectors.

The smoke detector 10 comprises a light emitting element 14, such as a light emitting diode (LED) in some embodiments, and a light receiving element 16, such as a photodiode in some embodiments. The light emitting element 14 and the light receiving element 16 are disposed within a detection area 18 of the smoke detector 10 that is fluidly coupled to the environment so that the smoke particles 12 are able to enter the detection area 18, but the area 18 is enclosed in such a way that no disturbing light from the environment can reach the light receiving element 16.

In operation, the light emitting element 14 emits light pulses 20 with a duration, or pulse length, and at various specified output levels, as shown in, and described in connection with, FIGS. 3-5. Due to the orientation of the optical axis of the light emitting element 14 and the light receiving element 16 no direct light can reach the light receiving element 16. Only some light is scattered as noise light 22 from the inner walls 24 of the detection area 18 and reaches the light receiving element 16, as shown in FIG. 2. In case of presence of smoke particles 12, as shown in FIG. 1, light is scattered by the smoke particles 12 and reaches the light receiving element 16 as scattered light 26. The amount of light reaching the light receiving element 16 is higher than that present in the condition of FIG. 2.

Figure 3:
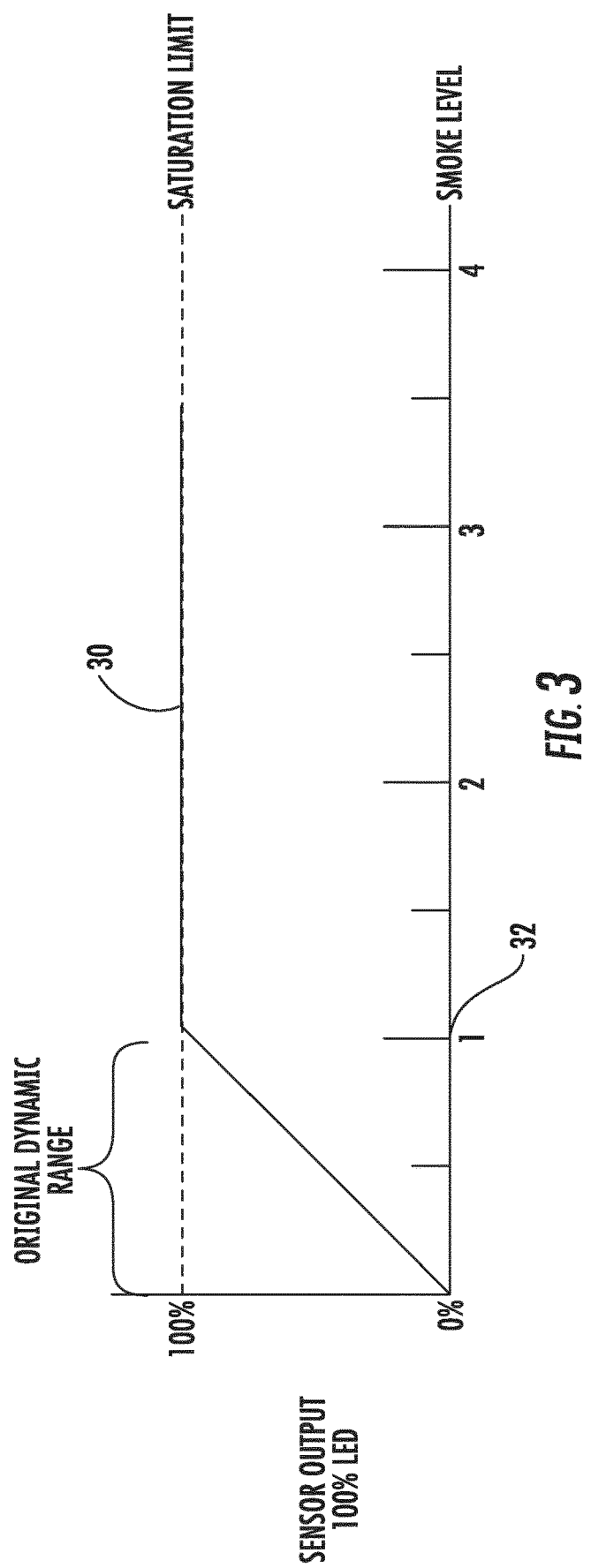
FIG. 3 illustrates a dynamic range of the smoke detector with 100% light emission output.
Figure 4:
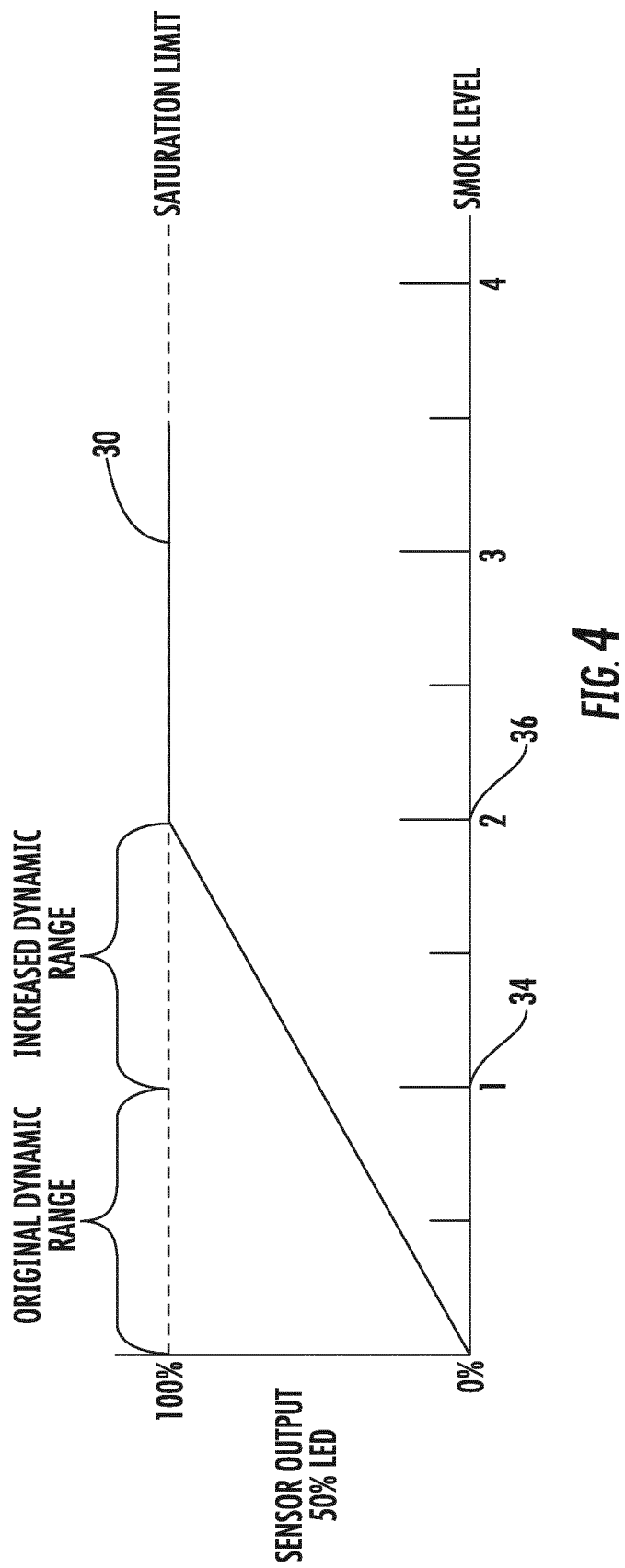
FIG. 4 illustrates a dynamic range of the smoke detector with 50% light emission output.
Figure 5:
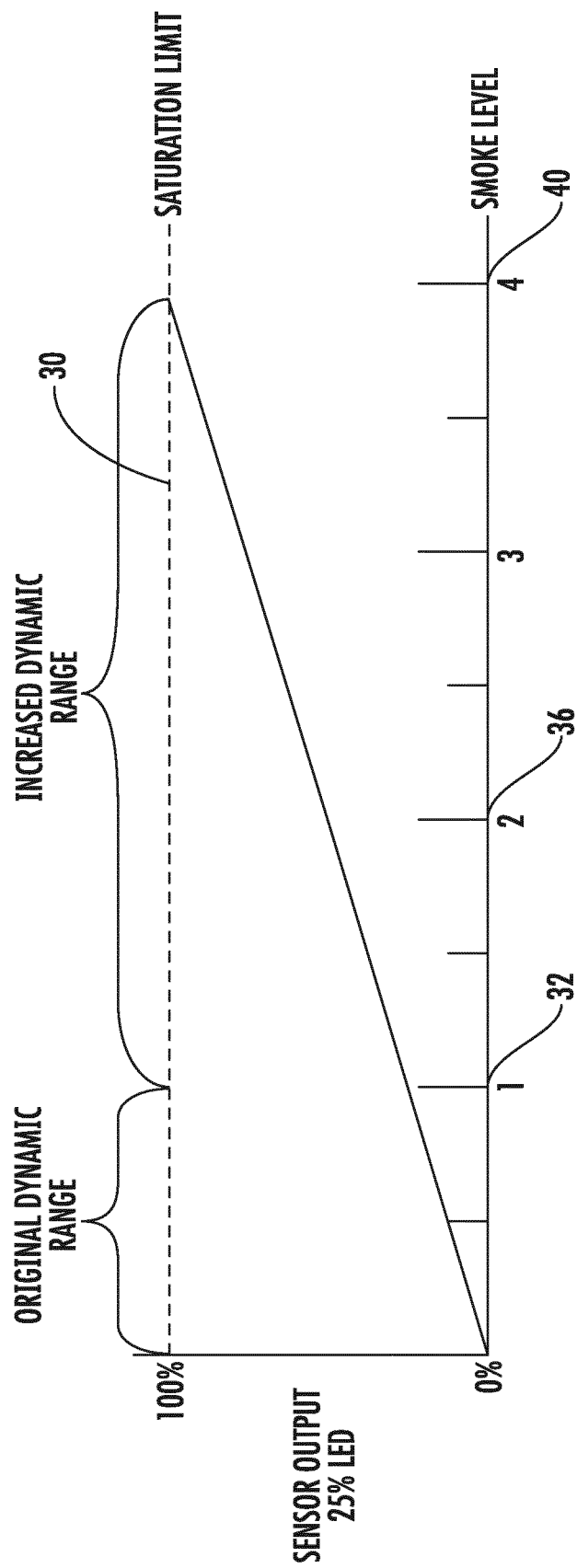
FIG. 5 illustrates a dynamic range of the smoke detector with 25% light emission output.

Referring to FIGS. 3-5, additional operation of the smoke detector 10 is illustrated. The smoke detector 10 automatically increases the dynamic range of the circuitry of the smoke detector 10 by dynamically reducing the light output level of the light emitting element 14 to avoid a nuisance alarm (also referred to as a false alarm) due to saturation as explained herein. In particular, a controller 50 (FIGS. 1 and 2) is in operative communication with the smoke detector 10 to monitor various conditions and initiate certain actions in response to such monitoring. The controller 50 monitors when a saturation limit of the detector circuitry is being approached and reduces the light output of the light emitting element 14 in such a condition.

FIG. 3 shows the smoke detector 10 operated with the light emitting element 14 outputting light at 100%. This operating condition illustrates a dynamic range associated with the saturation limit 30 being reached at a first smoke level 32.

In comparison, FIG. 4 shows the smoke detector 10 being operated at a fixed light output that is reduced by 50% when the signal reaches the saturation limit 30. In operation, the fixed light output level is operated at 100% until the saturation limit 30 is approached. At this point, the fixed light output level is reduced by 50%. The reduction effectively increases the dynamic range of the circuitry of the smoke detector 10. In particular, the dynamic range is doubled based on the 50% reduction, thereby resulting in the saturation limit being reached at a second smoke level 36. The saturation limit 30 is the fixed amount of light that hits the photodiode 16. When the light output is halved, approximately twice the amount of smoke is needed to reach the same saturation limit.

As shown in FIG. 5, the dynamic range may be further increased by additional light output reductions. By way of example, in continuing with the description associated with FIG. 4, an additional 50% reduction of the light output may be automatically performed once the saturation limit –30 is approached again. Therefore, FIG. 5 shows the light output of the light emitting element 14 being ultimately reduced to 25% to increase the dynamic range of the circuitry of the smoke detector 10 to the saturation limit 30 at a third smoke level 40 that is four times the dynamic range associated with light output at 100% for a duration of the operation.

It is to be appreciated that additional reductions may be performed to achieve further dynamic range increases.

Advantageously, nuisance alarms associated with saturation of the smoke detector 10 are avoided by the automatic light output reductions described above. For example, a substantial amount of steam (e.g., aerosols) rapidly released from a shower upon opening a door will quickly saturate a smoke detector when operated with 100% light output of the light emitting element 14. No option other than alarm is available to the smoke detector in such a condition. The system and method described herein automatically adjust the dynamic range upon saturation so that the smoke detector 10 may determine if a true alarm is required, i.e. by methods using a multi emitter and/or multi sensor assembly to identify the aerosol as dangerous or non-dangerous. Increased dynamic range may be achieved by using more expensive components, but the systems and methods described herein do not require expensive additional hardware in many cases, thereby avoiding additional cost, and increase resolution in saturation situations.

The use of the terms "a" and "an" and "the" and similar referents in the context of the present disclosure (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A smoke detector dynamic range adjustment system comprising:

a light emitting element for emitting light at a plurality of light output levels, the plurality of light output levels automatically adjusted by a controller when a saturation limit is approached; and a light receiving element for receiving light emitted from the light emitting element;

wherein the plurality of light output levels comprises a first output level and a second output level, wherein the second output level is less than the first output level;

wherein the second output level is half of the first output level;

wherein a dynamic range of the smoke detector is doubled by adjusting to the second output level relative to operation under only the first output level.

2. The system of claim 1, wherein the plurality of light output levels comprises a third output level that is less than the second output level.

3. The system of claim 2, wherein the third output level is half of the second output level.

4. The system of claim 1, wherein increasing the dynamic range dynamically distinguishes between dangerous and non-dangerous smoke or aerosols in a saturation situation to avoid nuisance alarms.

5. A smoke detector dynamic range adjustment system comprising:
- a light emitting element for emitting light at a plurality of light output levels, the plurality of light output levels automatically adjusted by a controller when a saturation limit is approached; and
- a light receiving element for receiving light emitted from the light emitting element;
- wherein the plurality of light output levels comprises a first output level and a second output level, wherein the second output level is less than the first output level;
- wherein the plurality of light output levels comprises a third output level that is less than the second output level;
- wherein the third output level is half of the second output level;
- wherein a dynamic range of the smoke detector is quadrupled by adjusting to the third output level relative to operation under only the first output level.

* * * * *